(12) United States Patent
Griggs, Jr.

(10) Patent No.: US 10,302,116 B2
(45) Date of Patent: May 28, 2019

(54) CAM ASSEMBLY WITH INTERLOCKING PARTS FOR FURNITURE

(71) Applicant: Billy Joe Griggs, Jr., Pulaski, TN (US)

(72) Inventor: Billy Joe Griggs, Jr., Pulaski, TN (US)

( * ) Notice: Subject to any disclaimer, the term of this patent is extended or adjusted under 35 U.S.C. 154(b) by 587 days.

(21) Appl. No.: 15/049,767

(22) Filed: Feb. 22, 2016

(65) Prior Publication Data

US 2016/0169258 A1  Jun. 16, 2016

Related U.S. Application Data

(63) Continuation of application No. 14/167,249, filed on Jan. 29, 2014, now Pat. No. 9,265,347.

(60) Provisional application No. 61/758,231, filed on Jan. 29, 2013.

(51) Int. Cl.
| | |
|---|---|
| *A47C 3/027* | (2006.01) |
| *F16B 12/40* | (2006.01) |
| *A47C 1/02* | (2006.01) |
| *F16B 12/10* | (2006.01) |

(52) U.S. Cl.
CPC ............ *F16B 12/40* (2013.01); *A47C 1/02* (2013.01); *A47C 3/027* (2013.01); *F16B 12/10* (2013.01); *Y10T 29/49826* (2015.01)

(58) Field of Classification Search
CPC ........... A47C 1/02; A47C 1/035; A47C 3/027; A47C 4/02; A47C 4/028; A47C 7/42
See application file for complete search history.

(56) References Cited

U.S. PATENT DOCUMENTS

| | | | | |
|---|---|---|---|---|
| 3,279,847 A | * | 10/1966 | Re ..................... | A47C 1/0345 297/259.2 |
| 3,302,969 A | * | 2/1967 | Mizelle ............... | A47C 1/0355 297/259.2 |
| 3,525,549 A | * | 8/1970 | Knabusch ............ | A47C 7/42 297/353 |
| 3,730,585 A | * | 5/1973 | Rogers, Jr. ........... | A47C 3/025 297/259.2 |
| 3,934,930 A | * | 1/1976 | Sandham ............ | A47C 7/445 297/291 |
| 3,989,298 A | * | 11/1976 | Cycowicz ............ | A47C 4/02 297/342 |
| 4,071,276 A | * | 1/1978 | Cecil .................. | A47C 1/0355 297/259.2 |
| 4,890,888 A | * | 1/1990 | Kostin ................ | B60N 2/68 297/440.21 |
| 5,184,871 A | * | 2/1993 | LaPointe ............. | A47C 4/02 297/440.21 |
| 5,269,589 A | * | 12/1993 | Brothers ............. | A47C 7/42 297/440.16 |
| 5,288,126 A | * | 2/1994 | Saul ................... | A47C 1/0355 297/322 |
| 5,520,441 A | * | 5/1996 | Citton ................ | A47C 7/42 297/440.21 |
| 5,658,049 A | * | 8/1997 | Adams ............... | A47C 4/02 297/440.16 |

(Continued)

FOREIGN PATENT DOCUMENTS

GB  2456044 A * 7/2009  ........... A47C 3/0257

*Primary Examiner* — Daniel J Wiley
(74) *Attorney, Agent, or Firm* — Wayne Edward Ramage; Baker Donelson

(57) ABSTRACT

A mechanism and method for assembling a base to a piece of furniture is provided with at least two cams having complimentary interlock mechanisms constructed and arranged to interlock one to another.

14 Claims, 5 Drawing Sheets

(56) References Cited

U.S. PATENT DOCUMENTS

| | | | | | |
|---|---|---|---|---|---|
| 6,309,015 | B1 * | 10/2001 | Pine | ...................... | A47C 3/027 |
| | | | | | 297/85 L |
| 6,557,942 | B1 * | 5/2003 | Shieh | ...................... | A47C 1/034 |
| | | | | | 297/440.15 |
| 6,698,840 | B1 * | 3/2004 | Tseng | ...................... | A47C 1/035 |
| | | | | | 297/440.15 |
| 6,752,464 | B1 * | 6/2004 | Tseng | ...................... | A47C 4/02 |
| | | | | | 297/411.35 |
| 6,918,632 | B2 * | 7/2005 | Maki | ...................... | A47C 3/027 |
| | | | | | 297/258.1 |
| 7,066,553 | B2 * | 6/2006 | Maloney | ................ | A47C 7/028 |
| | | | | | 297/440.2 |
| 7,328,949 | B2 * | 2/2008 | Donovan | ............. | A47C 3/0252 |
| | | | | | 297/259.2 |
| 7,628,452 | B2 * | 12/2009 | Du | ........................ | A47C 3/027 |
| | | | | | 297/259.2 |
| 7,832,806 | B2 * | 11/2010 | Yamada | ................... | B60N 2/22 |
| | | | | | 297/440.15 |
| 7,896,437 | B2 * | 3/2011 | Donovan | ............. | A47C 3/027 |
| | | | | | 297/258.1 |
| 7,909,407 | B2 * | 3/2011 | Dudash | ................... | B60N 2/20 |
| | | | | | 297/378.1 |
| 2006/0232113 | A1 * | 10/2006 | Hale | ...................... | A47C 3/027 |
| | | | | | 297/258.1 |

* cited by examiner

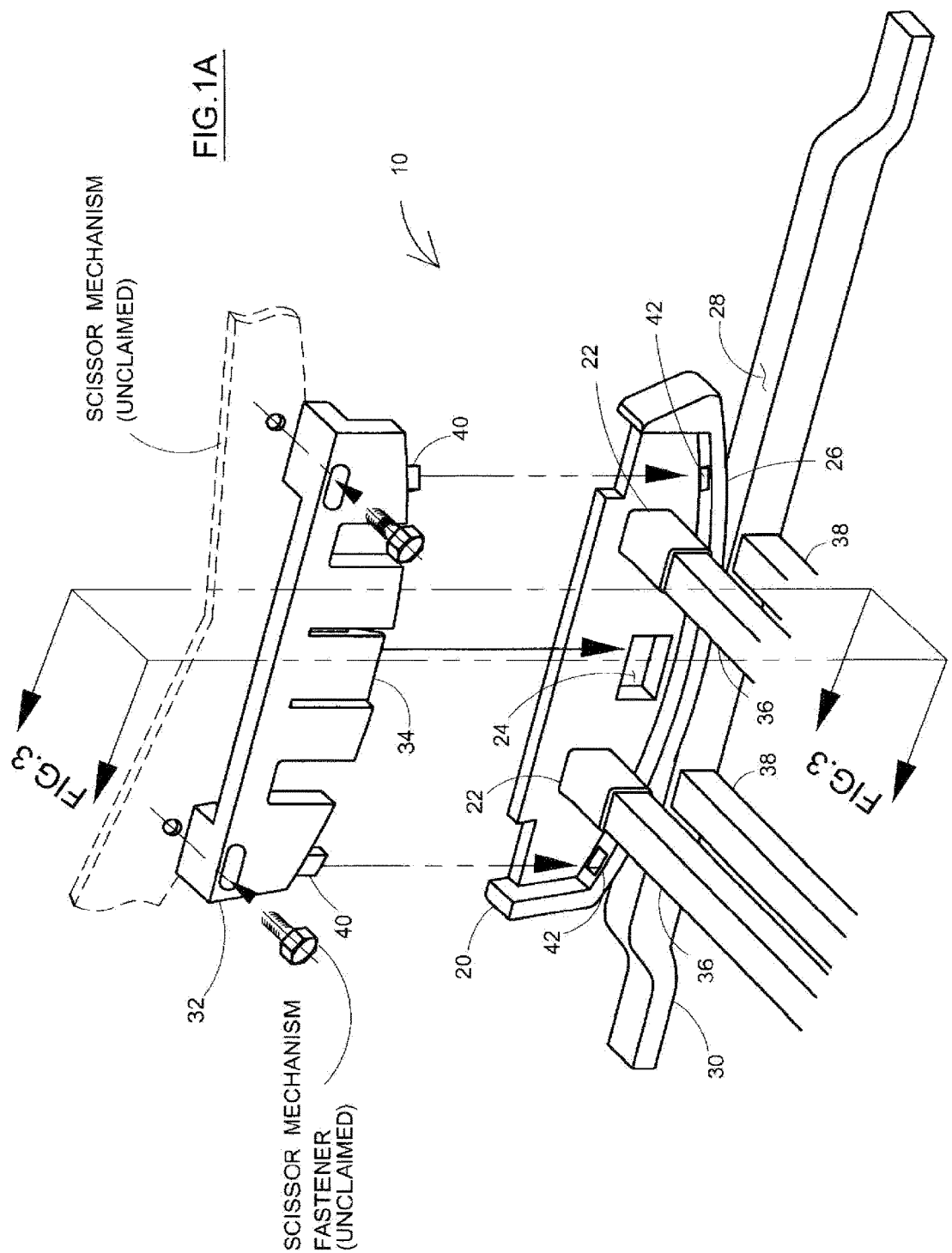

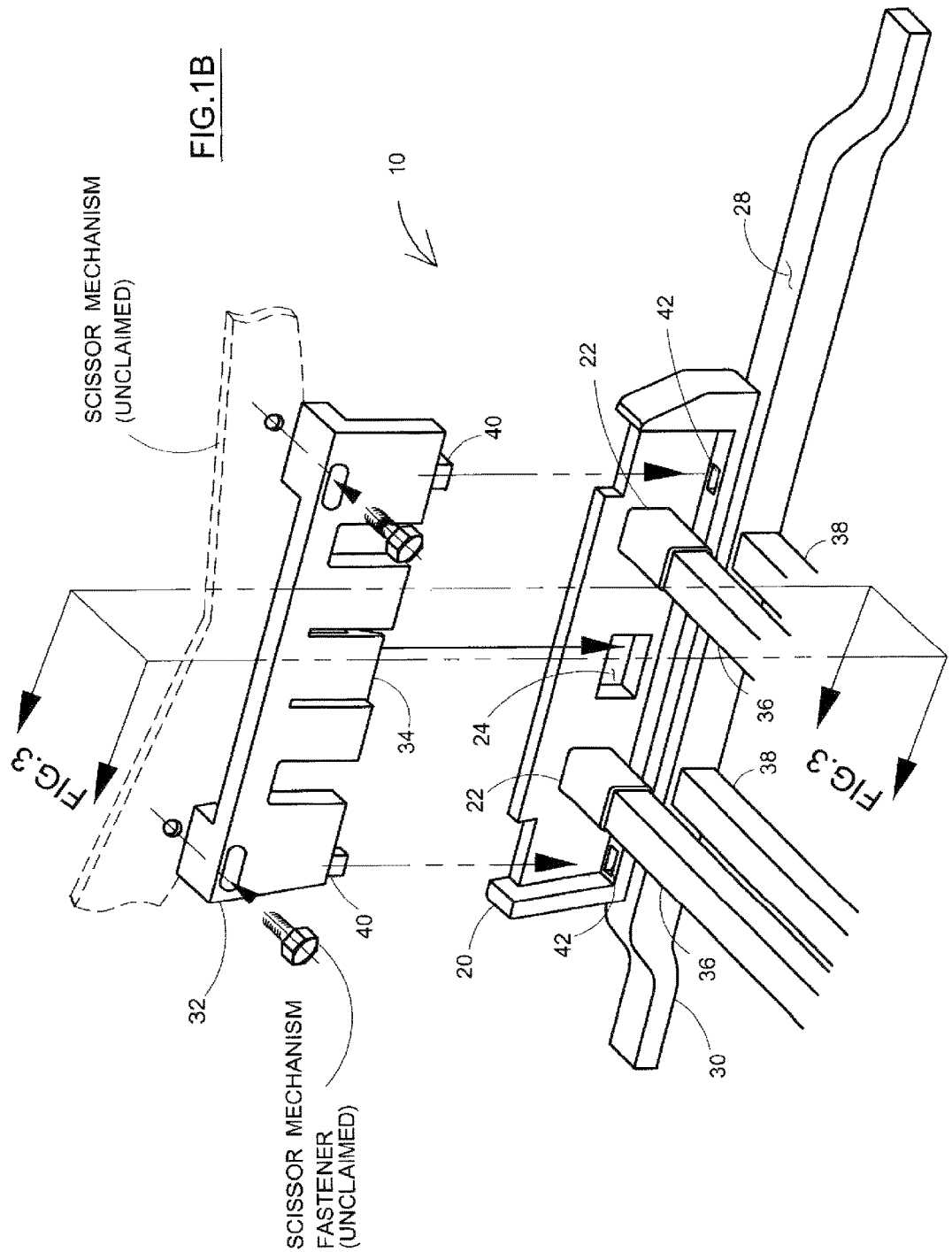

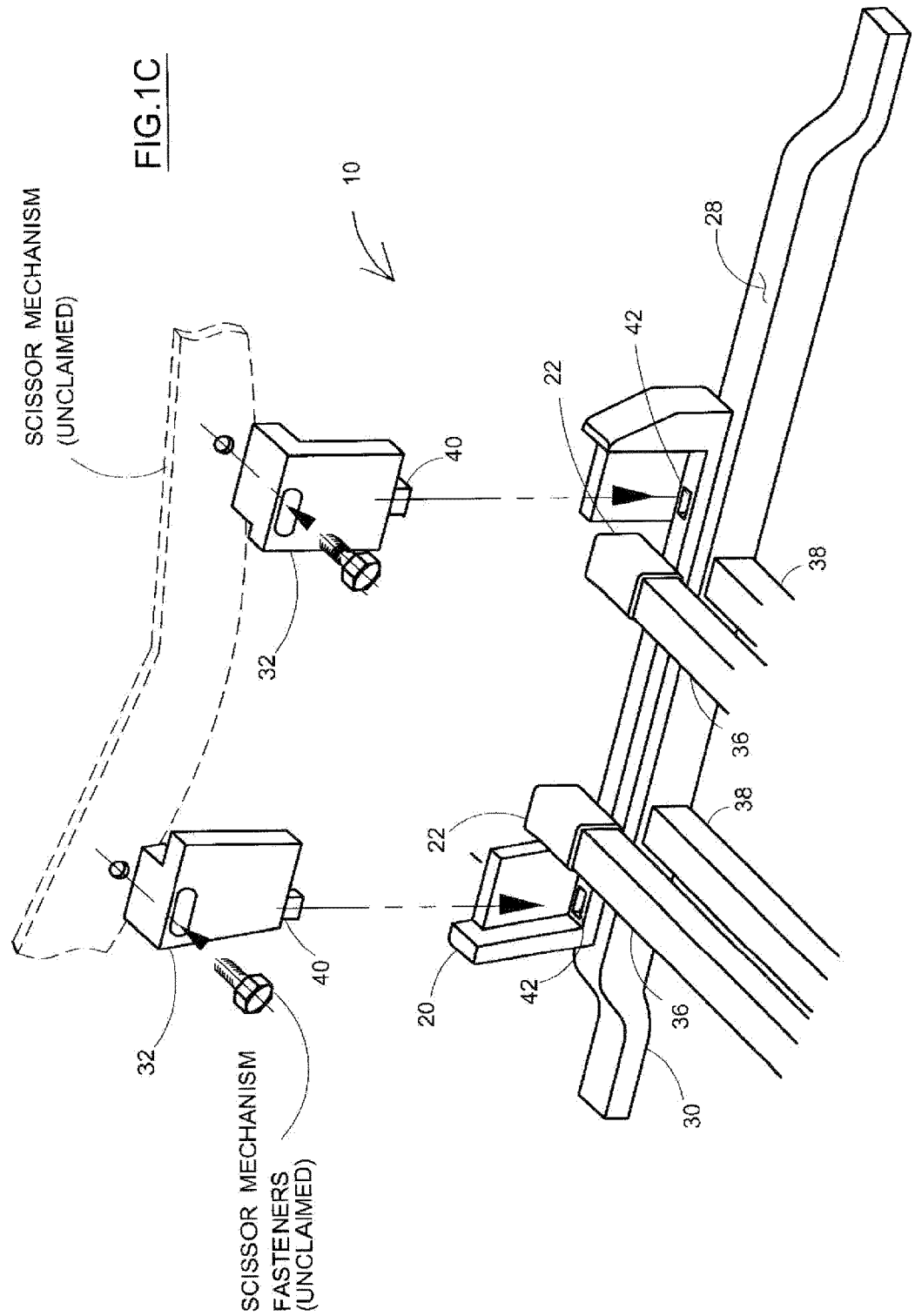

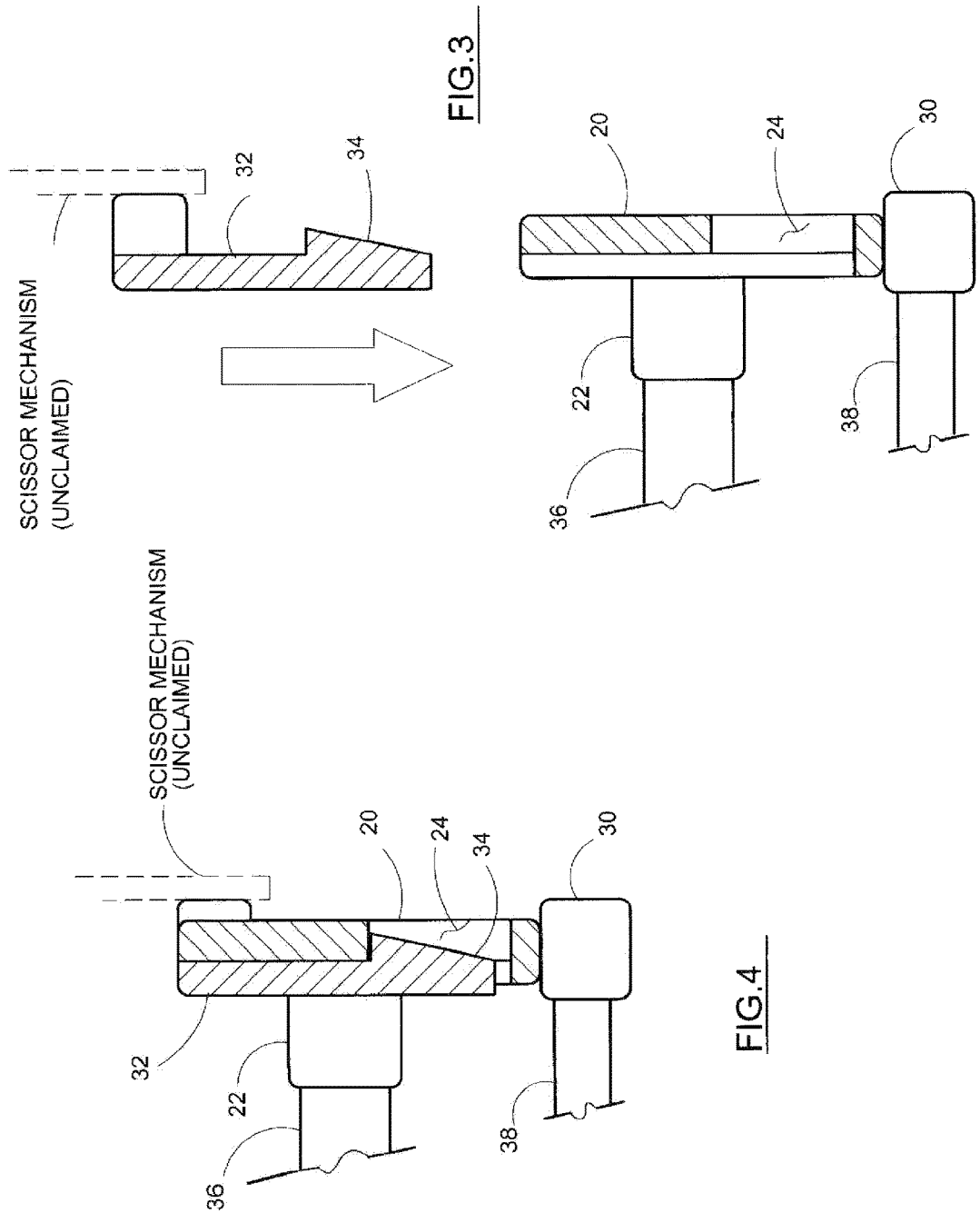

CAM ASSEMBLY WITH INTERLOCKING PARTS FOR FURNITURE

This application is a continuation application of U.S. application Ser. No. 14/167,249, filed Jan. 29, 2014, which claims benefit of and priority to U.S. Provisional Application No. 61/758,231, filed Jan. 29, 2013, by Billy Joe Griggs Jr., and is entitled to those filing dates for priority. The specification, figures, appendices and complete disclosure of U.S. Provisional Application No. 61/758,231 and U.S. application Ser. No. 14/167,249 are incorporated herein in their entireties by specific reference for all purposes.

FIELD OF INVENTION

This invention relates to a mechanism and system for a cam assembly for connecting parts for furniture.

BACKGROUND OF THE INVENTION

Ready to assemble furniture is very popular because it can be easier to assemble and relatively inexpensive as compared to fully assembled furniture. However, there are pieces of furniture that have been proven to be exceedingly difficult to provide as ready to assemble furniture.

Reclining furniture with rocker, glider, swivel and other mechanisms create particular problems when used in ready to assemble furniture. In fact the precision of preparing the interlocking parts is typically beyond the ability of the average person working with ready to assemble furniture. The present invention addresses this deficiency and provides a novel interlocking cam assembly whereby the interlocking cams are provided to allow for easier assembly of reclining and motion furniture. The multi-piece cam further provides a configuration that is more easily disassembled and serviced in the field.

SUMMARY OF INVENTION

In various embodiments, the present invention comprises a mechanism for assembling and connecting a furniture base to a piece of furniture. The assembly comprises a furniture base having a first cam, configured with a first cam interlock, associated therewith; a furniture frame having a second cam, configured with a second cam interlock, associated therewith; with each of said first cam and second cam interlocks configured to mate and interlock one to another.

The mechanism is configured to be used with a multitude of furniture bases including, but not limited to recliner mechanism bases, rockers, gliders, swivels, swivel rockers, swivel gliders, twin sleepers, full sleepers, queen sleepers, king sleepers, or combinations thereof.

In one embodiment, the first cam is a system including two or more cam units. In another embodiment, the second cam is a system including two or more cam units. The first cam may have two or more first cam interlocks, and the second cam may have two or more second cam interlocks.

In one exemplary embodiment, the first cam interlock is integrated onto said first cam. Similarly, the second cam interlock may be integrated onto said second cam. In several embodiments, the first cam interlock and said first cam are constructed of a unitary piece. The second cam interlock and said second cam also may be constructed of a unitary piece. The first cam interlock and said second cam interlock connect in a snap-fit locking arrangement.

The present invention further contemplates a method of connecting a furniture base to furniture, said method comprising the steps of: providing a first cam and second cam according to any of the configurations or combinations disclosed herein; associating said first cam with a furniture base; connecting said second cam to either a furniture seat box or a reclining mechanism; positioning said first and second cams to align respective interlocks; and interlocking each of said first and second cams one to another.

BRIEF DESCRIPTION OF THE DRAWINGS

FIG. 1A is a side perspective view of a two-piece cam assembly configuration in separated position.

FIG. 1B is a side perspective view of a two-piece cam assembly configuration in separated position.

FIG. 1C is a side perspective view of a four-piece cam assembly configuration in separated position.

FIG. 3 is a partial cross-section from FIGS. 1A and 1B with directional arrow indicating direction of connection of separate cam components.

FIG. 4 is a partial cross-section from FIGS. 1A, 1B, and 3 with separate cam components in a connected position.

DETAILED DESCRIPTION OF EXEMPLARY EMBODIMENTS

Figure 2:
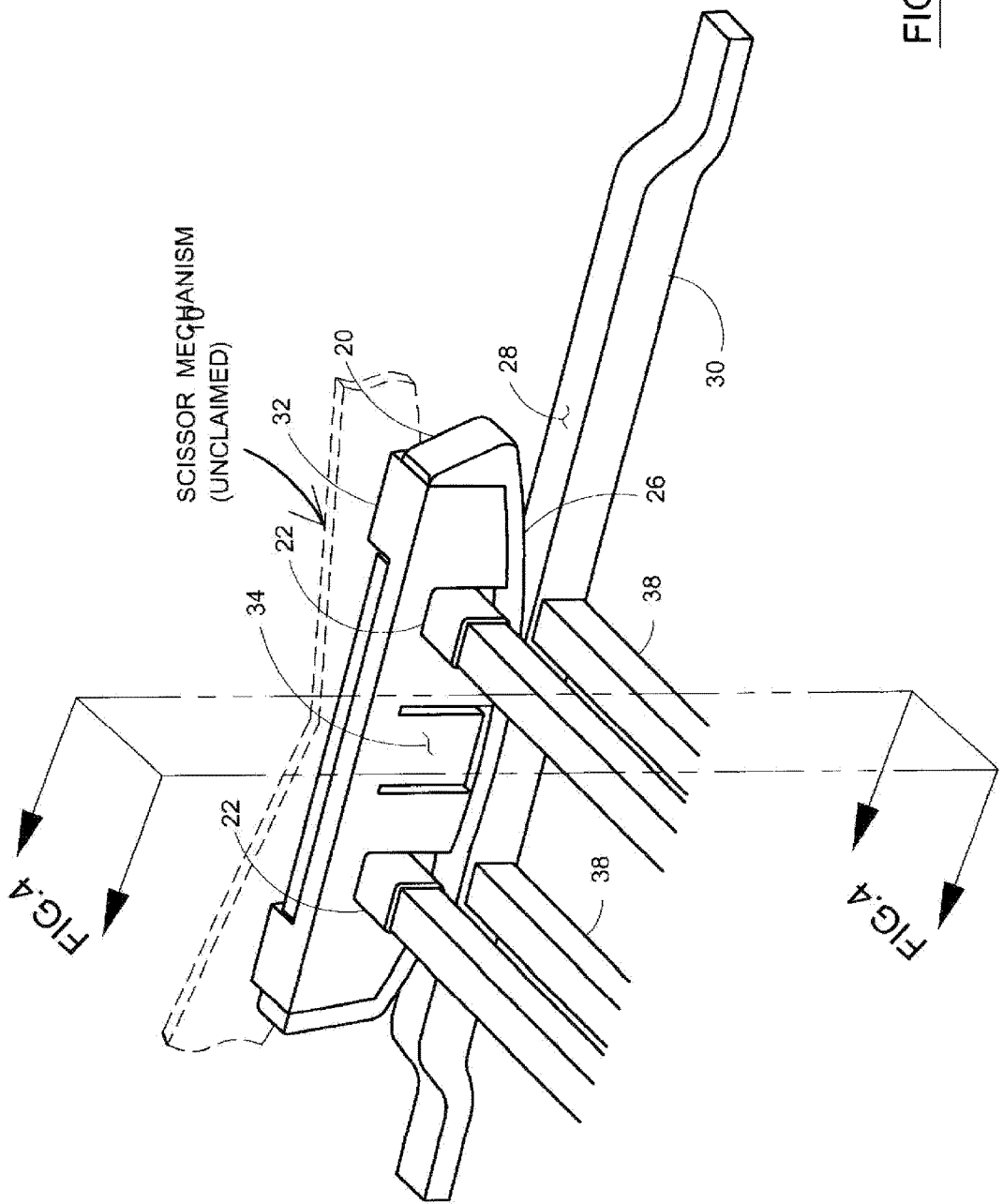
FIG. 2 is a side perspective view of a two-piece cam assembly configuration in a connected position.

In various exemplary embodiments, the present invention relates to a multi-piece cam assembly for furniture. The figures are demonstrative and the invention contemplates multiple configurations including, but not limited to two, three, four, and five cam component systems.

As generally understood, ready to assemble furniture is constructed such that an ordinarily skilled consumer can assemble the furniture. Reclining mechanisms are typically exceedingly complex and furthermore locking mechanisms are often excluded from ready to assemble furniture products.

In one embodiment, the two-piece cam is suitable for assembling a furniture base to the seat box portion of furniture. It is further contemplated that the present invention is suitable for connection of reclining mechanisms to a base in ready to assemble furniture. Reclining furniture is without limitation and includes, but is not limited to, a rocker, glider, swivel, swivel rocker, swivel glider, power variations of all of the above, sleepers, or any piece of furniture that utilizes reclining mechanism. However, the multi-piece cam assembly is suitable for all furniture where connection is desired.

In one embodiment, the two-piece cam is particularly well suited for connecting a furniture frame to a base. Although the drawings demonstrate a first cam as a locking cam connected to a furniture frame and a second or receiving cam connected to a base, the locking/receiving configurations are interchangeable.

First cam, configured as a receiving cam 20 is constructed and arranged with a locking orifice 24. Orifice 24 is constructed and arranged to interact with locking tab 34 on locking cam 32.

Receiving cam 20 has formed thereon a horizontal support receiver 22 which is constructed and arranged to receive horizontal supports 36 of the present invention. In one embodiment, as seen in FIG. 1A, receiving cam 20 is constructed arranged with a curved lower surface 26 that interacts with the upper surface 28 of furniture base 30. In another embodiment, as seen in FIG. 1B, cam 20 is flat and secured to base 30.

The locking cam 32 of the present invention is constructed and arranged to affix to the seat box or scissor/main assembly of a reclining mechanism of a piece of furniture. In one embodiment, locking cam 32 is affixed to the seat box. In another embodiment, the seat box frame or recliner frame is formed with a cam portion integral therewith.

Once locking cam 32 is affixed to the underside of an article of furniture it is positioned above receiving cam 20 whereby locking tab 34 interacts with locking tab 24 in order to removably interconnect locking cam 32 with receiving cam 20.

In the embodiment of FIG. 1C, receiving cams 20 are provided in pairs.

In use, cam 20 is positioned over a prepared upper surface 28 of furniture base 30. When locking cam 32 is positioned and locked onto receiving cam 20 the article of furniture attached thereto will be able to rock along base 30. Base 30 is constructed and arranged to have two main base portions each being 30 that are interconnected by transverse supports 38. Cam 20 has receiving socket 42 configured to mate with positioning tab 40 of cam 32.

In one embodiment the invention is a mechanism for a piece of furniture comprising: two or more locking cams, constructed and arranged with at least one locking mechanism on each cam; two or more receiving cams, said receiving cams are constructed and arranged to receive said locking mechanism, said interconnected cams are configured to be used in reclining furniture and sleepers to include, but not limited to, rockers, gliders, swivels, swivel rockers, swivel gliders, twin sleepers, full sleepers, queen sleepers, king sleepers. In addition, this mechanism assembly covers power reclining variations.

Although a particular embodiment is demonstrated, the multi-piece cam is contemplated to connect and disconnect in a male-female interlock arrangement. The two-piece cam represents a significant and unforeseen improvement in furniture design and construction by providing a construction element that improves ease of assembly and disassembly. The multi-piece cam assembly is suitable not only for rocking, reclining, and gliding assemblies, but for all furniture in which there is the attachment of a mechanism to a frame base. The multi cam configurations provide additional benefit relating to simplification of the assembly process.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention. Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A mechanism for assembling and connecting a furniture base to a furniture box, comprising:
   a first cam piece with a first side and a second side, and at least one first positioning element as part of the first cam piece, said first cam piece configured with at least one first cam interlock;
   a second cam piece with a first side and a second side, and at least one second positioning element as part of the second cam piece, said second cam piece configured with at least one second cam interlock;
   wherein when said first said cam piece is moved toward said second cam piece in a connection direction, with said at least one first positioning element and said a least one second positioning element aligned to engage each other, said first cam interlock and said second cam interlock are aligned to mate and interlock.

2. The mechanism of claim 1, wherein said first cam piece comprises two or more first cam elements.

3. The mechanism of claim 1, wherein said second cam piece comprises two or more second cam elements.

4. The mechanism of claim 1, said at least one first positioning element comprising a hole, slot, or channel adapted to receive said second positioning element.

5. The mechanism of claim 1, said at least one second positioning element comprising a hole, slot, or channel adapted to receive said first positioning element.

6. The mechanism of claim 1, wherein said at least one first positioning element extends from the first cam piece.

7. The mechanism of claim 6, wherein said at least one first positioning element extends from the first side or second side of the first cam piece.

8. The mechanism of claim 1, wherein said at least one second positioning element extends from the first side or second side of the first cam piece.

9. The mechanism of claim 1, wherein said at least one second positioning element extends from the first side or second side of the second cam piece.

10. The mechanism of claim 1, wherein said first cam piece is seated on a furniture base, and said second cam piece is affixed in a fixed position to a furniture box or a mechanism attached to said furniture box.

11. The mechanism of claim 10, wherein said furniture base is selected from a group consisting of a recliner base, a rocker base, a glider base, a swivel base, a swivel rocker base, a swivel glider base, a twin sleeper base, a full sleeper base, a queen sleeper base, and a king sleeper base.

12. The mechanism of claim 1, wherein said second cam piece is seated on a furniture base, and said first cam piece is affixed in a fixed position to a furniture box or a mechanism attached to said furniture box.

13. The mechanism of claim 12, wherein said furniture base is selected from a group consisting of a recliner base, a rocker base, a glider base, a swivel base, a swivel rocker base, a swivel glider base, a twin sleeper base, a full sleeper base, a queen sleeper base, and a king sleeper base.

14. The mechanism of claim 1, wherein said first cam piece and second cam piece are disengageable.

* * * * *